United States Patent
Bernard

(10) Patent No.: US 10,425,163 B2
(45) Date of Patent: Sep. 24, 2019

(54) CHANNEL BONDING TECHNIQUES IN A NETWORK

(71) Applicant: Calix, Inc., Petaluma, CA (US)

(72) Inventor: Christopher Thomas Bernard, Wayzata, MN (US)

(73) Assignee: Calix, Inc., Petaluma, CA (US)

(*) Notice: Subject to any disclaimer, the term of this patent is extended or adjusted under 35 U.S.C. 154(b) by 40 days.

(21) Appl. No.: 15/467,255

(22) Filed: Mar. 23, 2017

(65) Prior Publication Data

US 2017/0302379 A1 Oct. 19, 2017

Related U.S. Application Data

(60) Provisional application No. 62/322,321, filed on Apr. 14, 2016.

(51) Int. Cl.
| | |
|---|---|
| *H04J 14/00* | (2006.01) |
| *H04B 10/272* | (2013.01) |
| *H04L 12/28* | (2006.01) |
| *H04Q 11/00* | (2006.01) |
| *H04L 12/743* | (2013.01) |

(52) U.S. Cl.
CPC ....... *H04B 10/272* (2013.01); *H04L 12/2865* (2013.01); *H04L 12/2885* (2013.01); *H04Q 11/0067* (2013.01); *H04Q 11/0071* (2013.01); *H04L 45/7453* (2013.01); *H04Q 2011/0064* (2013.01)

(58) Field of Classification Search
CPC .. H04B 10/27; H04B 10/2503; H04B 10/272; H04L 12/2865; H04L 12/2885; H04L 45/7453; H04Q 11/0067; H04Q 11/0071; H04Q 2011/0064

USPC ...................................................... 398/43–78
See application file for complete search history.

(56) References Cited

U.S. PATENT DOCUMENTS

| | | | | |
|---|---|---|---|---|
| 8,611,745 | B2* | 12/2013 | Kashima | H04H 20/69 398/67 |
| 9,307,557 | B2* | 4/2016 | Kwon | H04L 47/10 |
| 9,407,372 | B2* | 8/2016 | Wu | H04Q 11/00 |
| 10,009,110 | B2* | 6/2018 | Remein | H04B 10/50 |
| 10,177,871 | B2* | 1/2019 | Luo | H04J 3/1694 |
| 2002/0149816 | A1* | 10/2002 | Spallin | H04Q 11/0062 398/58 |
| 2005/0265386 | A1 | 12/2005 | Smith et al. | |
| 2009/0060530 | A1 | 3/2009 | Biegert et al. | |
| 2012/0177373 | A1* | 7/2012 | Choi | H04J 14/0235 398/72 |

(Continued)

*Primary Examiner* — Mohammad R Sedighian
(74) *Attorney, Agent, or Firm* — Schwegman Lundberg & Woessner, P.A.

(57) ABSTRACT

A method of virtually bonding together at least two physical channels in an optical network terminal (ONT) of a passive optical network (PON) can include receiving, via the ONT, a plurality of frames from a network device, classifying, using a processor of the ONT, the plurality of frames into one of a plurality of services, assigning the service to the at least two physical channels of the ONT, wherein each of the at least two physical channels is associated with a respective laser of the ONT to transmit at a respective wavelength, and transmitting, toward an optical line terminal, the plurality of frames of the service using at least one of the at least two physical channels during an assigned time slot.

19 Claims, 5 Drawing Sheets

(56) References Cited

U.S. PATENT DOCUMENTS

2014/0199070 A1* 7/2014 Shellhammer ........ H04L 5/0046
  398/66
2016/0112547 A1* 4/2016 Porat ................... H04L 27/2613
  370/329

* cited by examiner

CHANNEL BONDING TECHNIQUES IN A NETWORK

CLAIM OF PRIORITY

This application claims the benefit of priority of U.S. Provisional Patent Application Ser. No. 62/322,321, titled "CHANNEL BONDING TECHNIQUES IN A NETWORK" to Christopher T. Bernard and filed on Apr. 14, 2016, which is herein incorporated by reference in its entirety.

TECHNICAL FIELD

This document pertains generally, but not by way of limitation, to computer networks.

BACKGROUND

Channel bonding is the term used to group discrete channels of a multi-channel system into a single group with increased throughput. Many access technologies such as Very-high-bit-rate digital subscriber line (VDSL), hybrid fiber-coaxial (HFC)/Data Over Cable Service Interface Specification (DOCSIS), Wi-Fi, and Ethernet employ channel bonding technology to increase throughput by linking multiple channels into a single virtual interface.

OVERVIEW

Multi-wavelength passive optical network (PON) technology can enable optical network terminals (ONTs) to gain additional capacity by simultaneously supporting multiple channels. Using various techniques of this disclosure, channel bonding can be used to increase throughput by linking multiple channels into a single virtual interface.

In some examples, this disclosure is directed to a method of virtually bonding together at least two physical channels in an optical network terminal (ONT) of a passive optical network (PON). The method comprises receiving, via the ONT, a plurality of frames from a network device; classifying, using a processor of the ONT, the plurality of frames into one of a plurality of services; assigning the service to the at least two physical channels of the ONT, wherein each of the at least two physical channels is associated with a respective laser of the ONT to transmit at a respective wavelength; and transmitting, toward an optical line terminal, the plurality of frames of the service using at least one of the at least two physical channels during an assigned time slot.

In some examples, this disclosure is directed to an optical network terminal (ONT) comprising one or more processors; and at least one memory including instructions that, when executed by the one or more processors, cause the one or more processors to perform operations to: receive a plurality of frames from a network device; classify the plurality of frames into one of a plurality of services; assign the service to the at least two physical channels of the ONT, wherein each of the at least two physical channels is associated with a respective laser of the ONT to transmit at a respective wavelength; and transmit, toward an optical line terminal (OLT), the plurality of frames of the service using at least one of the at least two physical channels during an assigned time slot.

In some examples, this disclosure is directed to an optical line terminal (OLT) comprising: one or more processors; and at least one memory including instructions that, when executed by the one or more processors, cause the one or more processors to perform operations to: receive a plurality of frames from a network device; classify the plurality of frames into one of a plurality of services; assign the service to the at least two physical channels of the OLT, wherein each of the at least two physical channels is associated with a respective laser of the OLT to transmit at a respective wavelength; and transmit, toward an optical network terminal (ONT), the plurality of frames of the service using at least one of the at least two physical channels during an assigned time slot.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
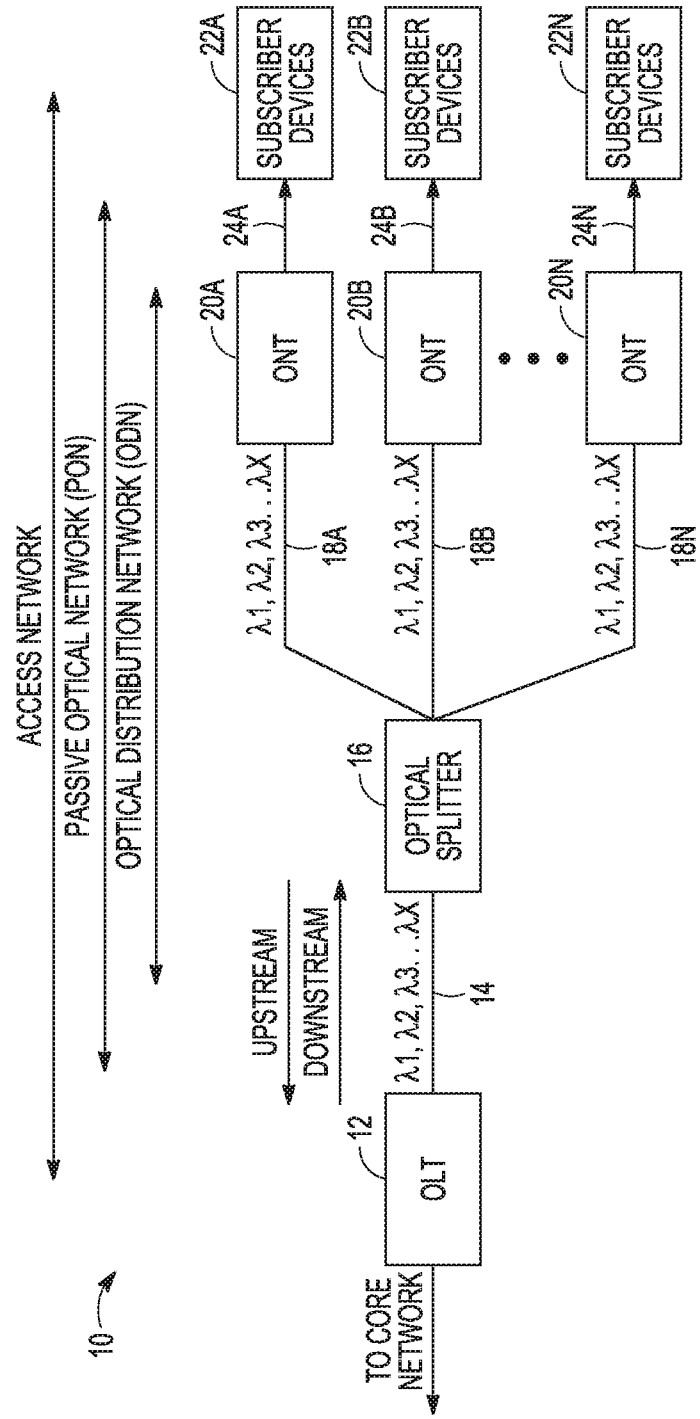
FIG. 1 is a block diagram illustrating an example network that can implement various techniques of this disclosure.

Within the ITU standards body, work is beginning to define the method for physical layer channel bonding on a multi-wavelength NG-PON2 ODN. At the moment, proposed methods include synchronized lasers and breaking the transport into small units such as bits, bytes, or FEC code words. The ONT can have a number of channels active and can break the frame apart across the active channels. The optical line terminal (OLT) can receive the active channels and reassemble the frame. By bonding these discrete channels, the ONT can access up to 40 gigabits per second (Gbs) throughput on a four-channel NG-PON2 system.

One drawback with the approaches being defined in the standards body is that the proposed techniques are likely incompatible with the existing single-channel standard, For example, Next-Generation Passive Optical Network ("NG-PON2") today can allow each channel to operate independently. Physical layer channel bonding is a fundamental change at the MAC/PHY layer that would likely require updates to application specific standard products (ASSPs). Additionally, there may be interoperability issues with 10/10 ONTs running on the same optical device network (ODN) as a 40/40 ONT. Advantageously, the techniques of this disclosure do not change the pre-existing MAC/PHY layer or OMCI provisioning layer and, as such, can be backward compatible.

This disclosure describes, among other things, techniques for virtually bonding together at least two physical channels in an ONT and/or an OLT of a PON, e.g., a PON using the NG-PON2 standard. Under the NG-PON2 standard, each port (associated with a wavelength of a laser) on an NG-PON2 ONT can be 10 Gigabit symmetric, with multiple wavelengths on a fiber. Currently, frames of a particular service, e.g., high speed internet (residential), Ethernet virtual circuit (commercial), etc., can be transmitted using one port/wavelength/channel on an ONT. Using various techniques of this disclosure, at least two physical channels in an ONT can be virtually bonded such that an ONT can have access to more than one wavelength per service. Thus, the ONT can provide more bandwidth, e.g., more than 10 Gigabits from one wavelength, by taking advantage of multiple wavelengths that are discrete.

Advantageously, the techniques of this disclosure can remain backwards compatible with the MAC/PHY layer and allow a mix of legacy ONTs, e.g., 10/10 ONTs, with channel-bonded ONTs, e.g., 40/40 ONTS, on the same ODN. For example, using various techniques of this disclosure, a service terminated on a 10/10 ONT can contain a single physical channel on the grouping and can ignore the service tunnel aggregation and operate the same as it does today. A service terminated on a 40/40 ONT can optionally create a grouping of up to four channels, allowing service flows to be sent on a multitude of physical channels allowing the aggregate service to approach 40 Gigabits per second (Gps) of capacity on a four channel PON. These techniques can scale to higher density groupings beyond four channels.

Each ONT MAC can be provisioned per the G.988 OMCI standard with a common provisioning schema. Each PON channel can run independently and unaware of the service-layer channel bonding. The service tunnel aggregation function of this disclosure can use an algorithm, e.g., hashing algorithm, to determine which physical interface a given service flow propagates. The far end service tunnel aggregation termination, e.g., at the optical line terminal, can receive the multitude of service flows and forward them to network interface aggregation.

The service tunnel aggregation techniques described in this disclosure can be designed for asymmetric operation. For example, a 40/10 ONT can utilize multi-channel downstream, but remain fixed to a single channel upstream.

Service tunnel aggregation can be designed to be compatible "over the top" of standard 10G PON implementations and can therefore be compatible with existing scheduling algorithms. Given discrete downstream/upstream bandwidth profiles, a service tunnel aggregation implementation can allow the bandwidth profile to exceed the single channel capacity and approach (N)×(channel-rate), where N is the number of channels defined in the service tunnel aggregation group.

For example, a 20G/20G bandwidth profile spread across 4 channels can be partitioned as (10/10, 10/10, 0/0, 0/0) or (5/5, 5/5, 5/5, 5/5). While the second implementation can have an advantage of load balancing, the maximum rate of any individual service flow can be limited to the maximum rate of the channel's service instantiation, which is 5G in this case. The first implementation, however, can allow greater maximums on individual flows, but does not utilize the full complement of channels. Multiple options for defining scheduling algorithms are available.

The virtualized interface of the service tunnel aggregation grouping techniques described in this disclosure can be advantageous over physical layer channel bonding techniques. For example, physical layer channel bonding may require a new standard. The MAC/PHY layer can be adapted to a multi-channel implementation where physical layers are coordinated into a 40G channel, for example. Bit/Byte/EEC/FS layer striping can be performed and may not be easily backwards compatible with 10G ONTs. Lasers can be synchronized in this method such that a 10G ONT could conceivably be supported, but the other three channels may be inactive during this time, which can result in significant amounts of wasted capacity. The techniques of this disclosure do not suffer from these shortcomings, FIG. 1 is a block diagram illustrating a simplified example network 10 that can implement various techniques of this disclosure. The optical network 10, e.g., NG-PON network, can include, among other things, an optical line terminal (OLT) 12 connected upstream to a core network. The OLT 12 can receive voice services such as, for example, plain old telephone service (POTS) from a public switched telephone network (PSTN). The OLT 12 can be coupled to one or more Internet service providers (ISPs) via the Internet and a router to support data services, such as T1 data services including Internet access. The OLT can also receive video content from video content suppliers via a streaming video headend. Video can also be provided as packet video over the Internet.

The OLT 12 can transmit optical signals using a plurality of wavelengths $\lambda 1$-$\lambda X$ on the optical trunk line 14 to an optical splitter 16. The optical splitter 16 can split the received signal and transmit the optical signals on optical fiber links 18A-18N using a plurality of wavelengths $\lambda 1$-$\lambda X$ to a plurality of optical network terminals (ONTs) 20A-20N (collectively referred to as optical network terminals 20). The optical network terminals can also be referred to as optical network terminals (ONTs). The ONTs 20A-20N can serve one or more respective subscriber devices 22A-22N (collectively referred to as subscriber devices 22) on a subscriber network.

Each of ONTs 20 can include hardware for receiving optical signals conveying information via optical fiber links 24A-24N, and delivering the information to one or more subscriber devices 22 as electrical signals. For example, each of ONTs 20 can serve as an optical network access point for one or more subscriber devices 22, including one or more computers, network appliances, televisions, set-top boxes, wireless devices, or the like, for delivery of data services such as Internet service. In addition, each of ONTs 20 can be connected to other subscriber devices in the form of subscriber telephones for delivery of telephone services. Hence, each of ONTs 20 can provide information in the form of RF or packet video to support video services, data to support Internet access services, and voice to support telephone services. Each of ONTs 20 can also include hardware for receiving information in the form of electrical signals from the subscriber devices and transmitting the information upstream over optical network as optical signals.

It should be noted that the optical distribution network (ODN) topology of the optical network 10 can include numerous other components, e.g., passive optical components, not depicted for the purpose of conciseness in the simplified example shown in FIG. 1. Additional information regarding optical networks can be found, for example, in commonly assigned US Patent Application Publication No. 2009/0060530 to Biegert et al., the entire contents of which being incorporated herein by reference.

As mentioned above, this disclosure describes, among other things, techniques for virtually bonding together at least two physical channels in an ONT and/or an OLT of a PON, e.g., a PON using the NG-PON2 (next-generation passive optical network) standard. Using various techniques of this disclosure, at least two physical channels in an ONT can be virtually bonded such that an ONT can have access to more than one wavelength per service. Thus, the ONT can provide more bandwidth, e.g., more than 10 Gigabits from one wavelength, by taking advantage of multiple wavelengths that are basically discrete.

The PON channel bonding (or service tunnel aggregation grouping) techniques described in this disclosure can build upon link aggregation protocols used to channel-bond point-to-point Ethernet lanes. The techniques of this disclosure can be considered related to IEEE 802.3ad link aggregation in the sense that a packet flow can propagate via one of many links, as defined by the link aggregration grouping. IEEE 802.3ad is defined for link-layer trunking of Ethernet ports, which are treated as a single interface within an Ethernet switch. However, the link aggregation group does not have scope beyond the link layer and does not span multiple hops in the network.

As a link aggregation example, two 10 Gigabit Ethernet links can be aggregated together to create a 20 Gigabit link. Link aggregation, however, is a channelized protocol that does not span anywhere beyond the physical layer. It is a physical layer protocol and does not extend beyond two switches connected together. As an example, on a network switch, link aggregation groups cannot represent a virtual local area network (VLAN).

Instead of Ethernet links, the service tunnel aggregation techniques of this disclosure can use services spanning multiple PON channels included in the grouping, e.g., using an XGEM encapsulation method for XG-PON. Rather than running on bonded Ethernet trunks, various techniques described in this disclosure can create a service tunnel aggregation grouping on each service containing up to the maximum number of physical channels that the subtending ONT can support. For example, an ONT can identify a service and assign the service to two or more ports, which can represent the service tunnel aggregation group.

The service tunnel aggregation techniques of this disclosure do not require any layer changes at the MAC/PHY layer, do not require tenability, and do not preclude physical channel bonding methods. The scope of the service tunnel aggregation group can span the MAC/PHY layer of the PON network, e.g., NG-PON2, and is not exposed to a customer facing interface.

To negotiate trunk groupings, IEEE 802.3ad uses a link aggregation control protocol (LACP). A similar method can be used for service tunnel aggregation grouping. Service tunnel aggregation grouping can be defined by a protocol, over OMCI, or by definition/provisioning of the service.

As described in detail below, using various techniques of this disclosure, frames from a network device, e.g., subscriber device 20A of FIG. 1, can be received by an ONT, e.g., ONT 20A of FIG. 1, and can be classified by the ONT into a service, e.g., high speed internet (residential), Ethernet virtual circuit (commercial), etc., by a switch, e.g., switch 38 of FIG. 2. The ONT can assign the service to two or more two physical channels of the ONT, where each of the two or more physical channels is associated with a respective laser of the ONT to transmit at a respective wavelength. Then, the ONT can transmit, toward an optical line terminal, e.g., OLT 12 of FIG. 1, the frames of the service using at least one of the two or more physical channels during an assigned time slot. In this manner, at least two physical channels in an ONT of a PON can be virtually bonded together.

Figure 2:
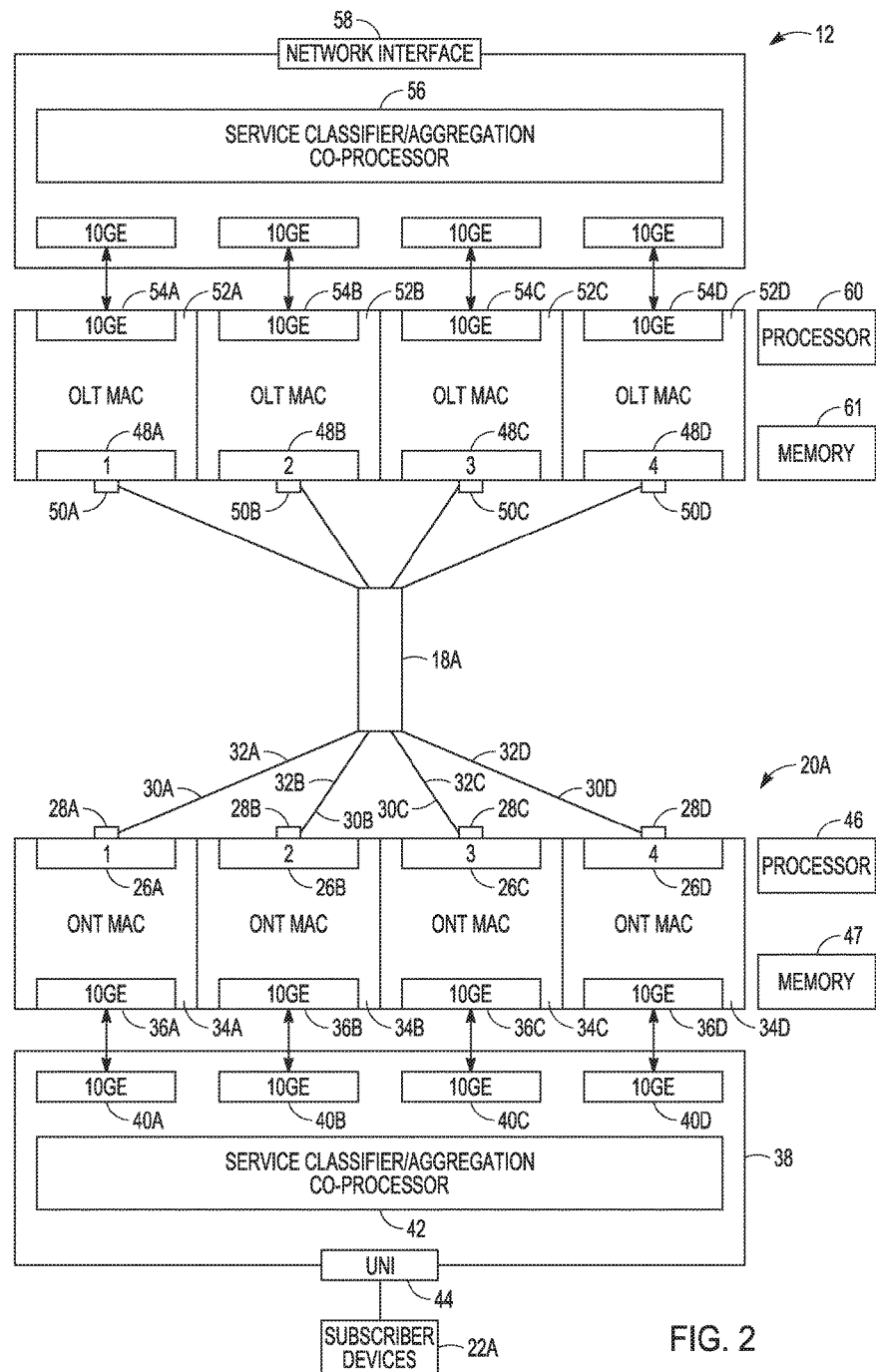
FIG. 2 is a conceptual diagram illustrating an example channel bonding topology using various techniques of this disclosure.

FIG. 2 is a conceptual diagram illustrating an example channel bonding topology using various techniques of this disclosure. FIG. 2 depicts an OLT 12, e.g., the OLT 12 of FIG. 1, coupled to an ONT, e.g., the ONT 20A, both of FIG. 1. For simplicity, any intervening components between the OLT and the ONT in the ODN are not depicted.

In the example configuration shown in FIG. 2, the ONT 20A can include four bidirectional optical assemblies 26A-26D (referred to collectively as "optical assemblies 26"). Each of the optical assemblies 26 can include a respective network interface 28A-28D, e.g., 10 Gigabit, to connect an optical assembly to the optical fiber 18A, and can terminate the optical signals received via the optical fibers 30A-30D. Each network interface 28A-28D can be associated with a physical channel, which are graphically depicted as channels 32A-32D respectively associated with optical fibers 30A-30D.

Each of the optical assemblies 26 can include, for example, a multi-wavelength diplexer or triplexer having, among other things, a laser diode for transmitting optical signals and a photodetector and transimpedance amplifier for receiving optical signals. Each laser diode is configured to transmit at a specific wavelength and, as such, is associated with a particular network interface, or channel, of the ONT. Each ONT 20 is assigned a periodic time-slot during which it can transmit to and receive from the OLT 12.

Coupled to respective optical assemblies 26, the ONT 20A can include four discrete PON circuits 34A-34D, e.g., Next-Generation Passive Optical Network 2 ("NG-PON2"). For example, the four discrete PON circuits 34A-34D (referred to collectively as "circuits 34") can be system-on-a-chip integrated circuits ("SOCs").

Each of the circuits 34 can receive the optical signals received via the optical fiber 18A and can generate electrical physical ("PHY") layer signals. As such, each of the circuits 34 can be considered to provide physical (PHY) layer functions, or layer 1 functions, of the open systems interconnection (OSI) model to generate electrical PHY layer signals. The electrical PHY layer signals may be in the form of raw bits, e.g., zeros and ones.

Each of the circuits 34 can include a media access control ("MAC") circuit that can implement at least a portion of the data link layer, or layer 2, of the OSI model. Each of the circuits 34 can convert the electrical PHY layer signals to distinct data units, such as Gigabit Ethernet (GE) frames, packets, or other types of layer 2 data units.

Each of the circuits 34 can be coupled to respective Ethernet MAC/PHYs 36A-36D, e.g., 10 Gigabit, that can convert the layer 2 data units from the MAC circuit to electrical PHY layer signals that can be transmitted via respective ports (not depicted) to respective ports (not depicted) of a network switch 38.

The network switch 38 can include Ethernet MAC/PHYs 40A-40D, e.g., 10 Gigabit, that can convert the layer 2 data units from the MAC circuit to electrical PHY layer signals. The switch 38 can include a service classifier/aggregation switch circuit 42 that can classify data units according to service and aggregate the classified data units. The service classifier/aggregation switch circuit 42 can be implemented using various hardware including a processor, e.g., network processor, a field programmable gate array (FPGA), or other hardware-based accelerator co-processor that can implement wire-rate packet processing.

The switch 38 can include circuits to switch, route or otherwise distribute the downstream data units to various subscriber devices of a respective subscriber device, e.g., subscriber device 22A of FIG. 1, using user network interface (UNI) 44, or distribute the upstream data units to the channels 32A-32D.

The ONT 20A can include a processor 46 that can, among other things, control various functions of the service classifier/aggregation switch circuit 42 and perform encapsulation of data received by the service classifier/aggregation switch circuit 42, which can then be forwarded to the circuits 34A-34D via an Ethernet MAC circuit. In some examples, the processor 46 can be instantiated within each of the circuits 34. In other examples, the processor 46 can be a stand-alone processor, as shown in FIG. 2.

The processor 46 can execute software instructions, such as those used to define a software or computer program, stored in a computer-readable storage medium such as a memory 47 (e.g., a Flash memory, random access memory (RAM), or any other type of volatile or non-volatile memory that stores instructions), or a storage device (e.g., a disk drive, or an optical drive).

As mentioned above, this disclosure describes, among other things, techniques for virtually bonding together at least two physical channels in an ONT and/or an OLT of a PON, e.g., a PON using the NG-PON2 standard. Under the NG-PON2 standard, each port (associated with a wavelength of a laser) on an NG-PON2 ONT can be 10 Gigabit symmetric, with multiple wavelengths on a fiber. Currently, frames of a particular service, e.g., high speed internet (residential), Ethernet virtual circuit (commercial), etc., can be transmitted using one port/wavelength on an ONT. Using various techniques of this disclosure, at least two physical channels in an ONT can be virtually bonded such that an ONT can have access to more than one wavelength per service. Thus, the ONT can provide more bandwidth, e.g., more than 10 Gigabits from one wavelength, by taking advantage of multiple wavelengths that are basically discrete.

Using various techniques of this disclosure, frames from a subscriber device 22A can be received via the UNI 44 by the ONT 20A. The processor 46 can control the service classifier/aggregation switch circuit 42 to classify the frames into one or more services, e.g., high speed internet (residential), Ethernet virtual circuit (commercial), etc., and aggregate the classified data units per their respective service.

The processor 46 can assign a service to two or more two physical channels of the ONT, e.g., two or more of the channels 32A-32D, where each of the two or more physical channels is associated with a respective laser of the ONT to transmit at a respective wavelength, e.g., a laser of an optical module 26A-26D. For example, the processor 46 can assign all residential high speed internet service to physical channels 32A and 32B. Thus, any frames classified as residential high speed internet service can be transmitted by the ONT using both channels 32A and 32B, thereby doubling the available bandwidth for that service.

In some example implementations, the service classifier/aggregation switch circuit 42 of the ONT 20A can classify the plurality of frames received from the subscriber network device 22A using an NG-PON2 encapsulation method (XGEM) port ID (or XGEM ID) that identifies the classified service, An XGEM port ID is a header that can be added to an Ethernet frame before the frame is sent onto the network. A PON is a point to multi-point network. As such, there is a lot of traffic toward a premise that is not meant for that premise. The XGEM port ID can designate/identify a service so that any traffic with that particular XGEM port ID can be directed to a particular ONT.

In some example implementations, the service classifier/aggregation switch circuit 42 can assign the plurality of received frames to the two or more physical channels based on the XGEM port ID. This can allow the service classifier/aggregation switch circuit 42 to give the same XGEM port ID to two or more channels so that the XGEM port ID can span two or more physical channels. If the ONT 20A has access to the two or more channels, it can transmit the frames associated with the service on any of the two or more channels to the OLT 12. The processor 46 can then encapsulate the frames with the XGEM port ID.

After the service classifier/aggregation switch circuit 42 has classified the frames into one or more services and aggregated the classified frames to two or more channels, the processor 46 can control the switch circuit 42 to switch the classified frames toward their assigned channel(s) using respective Ethernet MAC/PHYs 40A-40D. The classified frames can be received by the circuits 34A-34D associated with the assigned channel(s) using respective Ethernet MAC/PHYs 36A-36D.

The circuits 34A-34D associated with the assigned channel(s) can convert the received frames to optical signals. Then, the processor 46 can control a laser of an optical module 26A-26D associated with the assigned channel(s) to transmit the optical signals (toward the optical line terminal 12) that represent the frames of the classified service using at least one of the two or more physical channels during an assigned time slot. This is in contrast to link aggregation techniques that can transmit or receive continuously.

In the specific non-limiting example above, if the processor 46 assigned all residential high speed internet service to physical channels 26A and 26B, then any frames classified as residential high speed internet service can be transmitted by the ONT using both channels 26A and 26B, thereby doubling the available bandwidth for that service. In this manner, at least two physical channels in an ONT of a PON, e.g., physical channels 26A and 26B can be virtually bonded together.

Using some techniques, once an ONT 20A receives a frame from a subscriber device, the ONT 20A can eventually place the frame in an upstream queue according to the XGEM port ID classification. Here, however, because the physical channels having different wavelengths have been virtually bonded, the ONT 20A can put the frames in any of the two or more bonded channels, e.g., channels 32A and 32B. Various techniques of distributing the frames to the channels are described below, including using a hashing function and using scatter-gather techniques, such as queue backlog techniques and round-robin techniques. The scatter-gather techniques are described below with respect to FIG. 4.

In some example implementations, the ONT can transmit the frames of the classified service toward the OLT 12 by applying a hashing (or hash) function or algorithm to each of the plurality of received frames and assigning the plurality of received frames to the two or more physical channels based on a result of the hashing function. Hashing functions are known to those of ordinary skill in the art and can be used to map the classified frames to the two or more physical channels. In some examples, the switch circuit 42 can separate frames into flows and the switch circuit 42 can assign each flow to one or more of the bonded channels.

As an example, a hashing function can be applied to one or more fields of the frame, e.g., the header of the frame. For example, the switch circuit 42 can apply a hashing function to at least one of a media access control (MAC) address and an internet protocol (IP) address of each of the plurality of received frames. By way of non-limiting example, the switch circuit 42 can perform an exclusive OR (XOR) function on a portion of the header, e.g., all the bits of the MAC address. Based on a result of the hashing function, the switch circuit 42 can assign the plurality of received frames to the at least two physical channels. For example, if the result is even, the switch circuit 42 can assign the frame to channel 20A and if the result is odd, the switch circuit 42 can assign the frame to channel 20B. Thus, within the classified service, frame or packet flows can be partitioned to a single physical channel using a hashing function or algorithm in order to maintain frame order.

In some examples, a user can specify the particular hashing function used by the switch circuit 42. For example, the user could specify that the switch circuit 42 use the MAC address, the IP address, a cyclic redundancy check (CRC) of the frame, or some randomized function that can output a channel based on the header information.

The service tunnel aggregation techniques of this disclosure can be backwards compatible with single-channel ONTs. Frame order can be guaranteed within a hash-flow. Each service instantiation can be configured identically on all tunnel-aggregation members, e.g., same matchlist, tag-action, shaper, etc. In some examples, there can be up to four copies of the same service, such that any classified frame can propagate via any channel.

The ONT 20A can transmit the frames to the OLT 12 by the processor 46 controlling a laser of an optical module 26A-26D associated with the assigned channel(s) to transmit the optical signals that represent the frames of the classified service using at least one of the two or more physical channels during an assigned time slot toward the OLT 12. The OLT 12 can include four bidirectional optical assemblies 48A-48D (referred to collectively as "optical assemblies 48"). Each of the optical assemblies 48 can be coupled to a network interface 50A-50D, 10 Gigabit, to connect an optical assembly 48 to one of the optical fibers 30A-30D, and can terminate the optical signals received via the optical fibers 30A-30D. Each network interface 50A-50D can be associated with a physical channel 32A-32D respectively associated with optical fibers 30A-30D.

Each of the optical assemblies 48 of the OLT 12 can include, for example, a multi-wavelength diplexer or tri-plexer having, among other things, a laser diode for transmitting optical signals and a photodetector and transimpedance amplifier for receiving optical signals. Each laser diode is configured to transmit at a specific wavelength and, as such, is associated with a particular network interface, or channel, of the ONT.

Coupled to respective optical assemblies 48, the OLT 12A can include four PON circuits 52A-52D, e.g., Next-Generation Passive Optical Network 2 ("NG-PON2"). Each of the circuits 52A-52D can receive the optical signals received via the optical fiber 18A and can generate electrical physical ("PHY") layer signals. As such, each of the circuits 50A-50D can be considered to provide physical (PHY) layer functions, or layer 1 functions, of the open systems interconnection (OSI) model to generate electrical PHY layer signals. The electrical PHY layer signals may be in the form of raw bits, e.g., zeros and ones. Each of the circuits 50A-50D of the OLT 12 can include a media access control ("MAC") circuit that can implement at least a portion of the data link layer, or layer 2, of the OSI model. Each of the circuits 50A-50D can convert the electrical PHY layer signals to distinct data units, such as Gigabit Ethernet (GE) frames, packets, or other types of layer 2 data units.

Each of the circuits 50A-50D of the OLT 12 can be coupled to respective Ethernet MAC/PHYs 54A-54D, e.g., 10 Gigabit, that can convert the layer 2 data units from the MAC circuit to electrical PHY layer signals. The OLT 12 can include a service classifier/aggregation switch circuit 56 that can classify data units according to service and aggregate the classified data units. The switch circuit 56 can include circuits to switch, route or otherwise distribute the data units to the network interface 58. The service classifier/aggregation switch circuit 56 can be implemented using various hardware including a processor, e.g., network processor, a field programmable gate array (FPGA), or other hardware-based accelerator co-processor that can implement wire-rate packet processing.

The OLT 12 can include a processor 60 that can, among other things, control various functions of the service classifier/aggregation switch circuit 56 and perform encapsulation of data received by the service classifier/aggregation switch circuit 56, which can then be forwarded to the circuits 52A-52D via an Ethernet MAC circuit. The processor 60 can execute software instructions, such as those used to define a software or computer program, stored in a computer-readable storage medium such as a memory 61 (e.g., a Flash memory, random access memory (RAM), or any other type of volatile or non-volatile memory that stores instructions), or a storage device (e.g., a disk drive, or an optical drive).

In the downstream direction (from the OLT 12 to the ONT 20A), the OLT 12 can perform the channel bonding techniques using circuitry corresponding to that described above with respect to the ONT 20A. For purposes of conciseness, those techniques will not be described again. It should be noted that although FIG. 2 depicts four network interfaces/channels on the ONT 20A and the OLT 12, the techniques of this disclosure are not limited to such a configuration. Rather, the techniques of this disclosure can be applied to ONTs and OLTs having more (or less) than four network interfaces/channels.

In some examples, individual flows can be limited to the maximum physical channel throughput and can be subject to channel backlog. Each ONT MAC instance can be configured with the same service provisioning. Dynamic hashing can be used based on backpressure, e.g., dynamic bandwidth allocation (DBA) backlog, or pause frames. In some example implementations, asymmetric ONTs, e.g., 40/10 ONTs, can utilize service tunnel aggregation in the downstream, but remain fixed in the upstream. The far-end, e.g., OLT 12, can aggregate the frames into the network interface without any reordering.

As indicated the example configuration of FIG. 2, the ONT 20A can implement various techniques of this disclosure using discrete NG-PON2 SOCs. In other example configurations, the techniques described above with respect to FIG. 2 can be implemented using a single chip solution, such as shown in FIG. 3.

Figure 3:
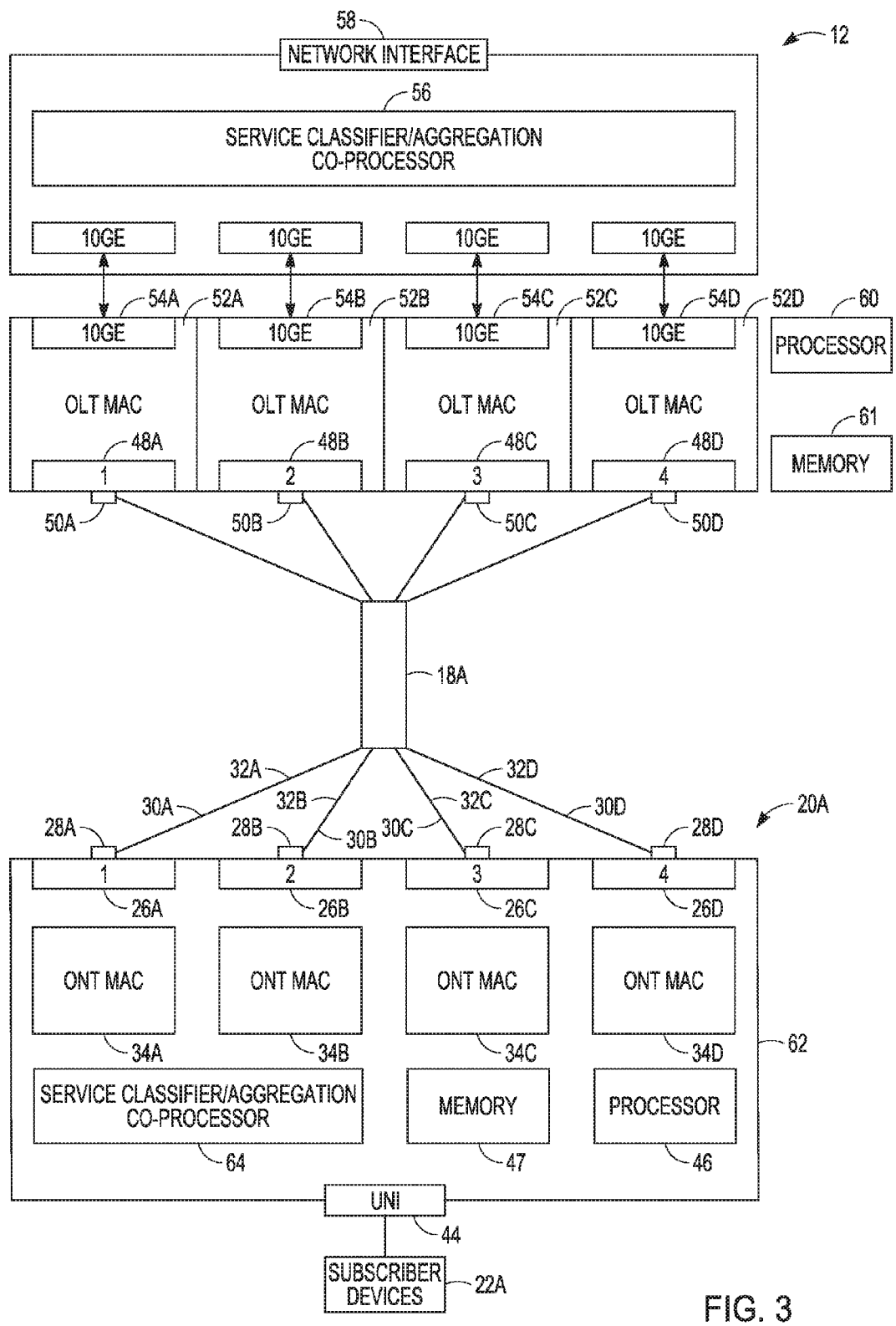
FIG. 3 is a conceptual diagram illustrating another example channel bonding topology using various techniques of this disclosure.

FIG. 3 is a conceptual diagram illustrating another example channel bonding topology using various techniques of this disclosure. FIG. 3 depicts an OLT, e.g., the OLT 12 of FIG. 1, coupled to an ONT, e.g., the ONT 20A, both of FIG. 1. For simplicity, any intervening components between the OLT and the ONT in the ODN are not depicted.

In contrast to FIG. 2, FIG. 3 depicts an ONT constructed using a single integrated circuit 62. For example, the circuitry of ONT 20A shown in FIG. 2 can built using a programmable device, such as a field programmable gate array (FPGA).

In the example configuration shown in FIG. 3, the ONT 20A can include four bidirectional optical assemblies 26A-

26D (referred to collectively as "optical assemblies 26"), as described above with respect to FIG. 2.

Coupled to respective optical assemblies 26, the ONT 20A can include four PON circuits 34A-34D, e.g., Next-Generation Passive Optical Network 2 ("NG-PON2"). The four PON circuits 34A-34D are referred to collectively as "circuits 34A-34D". Each of the circuits 34A-34D can receive the optical signals received via the optical fiber 18A and can generate electrical physical ("PHY") layer signals. As such, each of the circuits 34 can be considered to provide physical (PHY) layer functions, or layer 1 functions, of the open systems interconnection (OSI) model to generate electrical PHY layer signals. The electrical PHY layer signals may be in the form of raw bits, e.g., zeros and ones.

Each of the circuits 34 can include a media access control ("MAC") circuit that can implement at least a portion of the data link layer, or layer 2, of the OSI model. That is, each of the circuits 34 can convert the electrical PHY layer signals to distinct data units, such as Gigabit Ethernet (GE) frames, packets, or other types of layer 2 data units.

Each of the circuits 34 can be coupled to a service classifier/aggregation switch circuit 64 that can classify data units according to service and aggregate the classified data units, as described above with respect to FIG. 2. Internally, the circuits 34A-34D can be connected to the service classifier/aggregation switch circuit 64 using an Ethernet MAC circuit (not depicted), e.g., 10 Gigabit Ethernet MAC, or using a proprietary direct packet connection.

The ONT 20A can include a processor 46 that can, among other things, perform encapsulation of data received by the service classifier/aggregation switch circuit 64, which can then be forwarded to the circuits 34A-34D via an Ethernet MAC circuit.

The ONT 20A and the OLT 12 of FIG. 3 can implement the channel bonding techniques described above with respect to FIG. 2. For purposes of conciseness, these techniques will not be described again.

This disclosure is also directed to scatter-gather forwarding algorithms to maximize channel bonding efficiency, e.g., in an NG-PON2 network, described below with respect to FIG. 4. In the context of a network streaming application, this disclosure describes a scatter-gather algorithm that can guarantee frame order of an open-ended transfer of data sent on an out-of-order transport. The out-of-order transport can be a channel-bonded NG-PON2 system, for example, but can also apply to other channel bonded PON implementations. Unlike a file transfer, the streaming service can be unbounded with no specific beginning or end.

Figure 4:
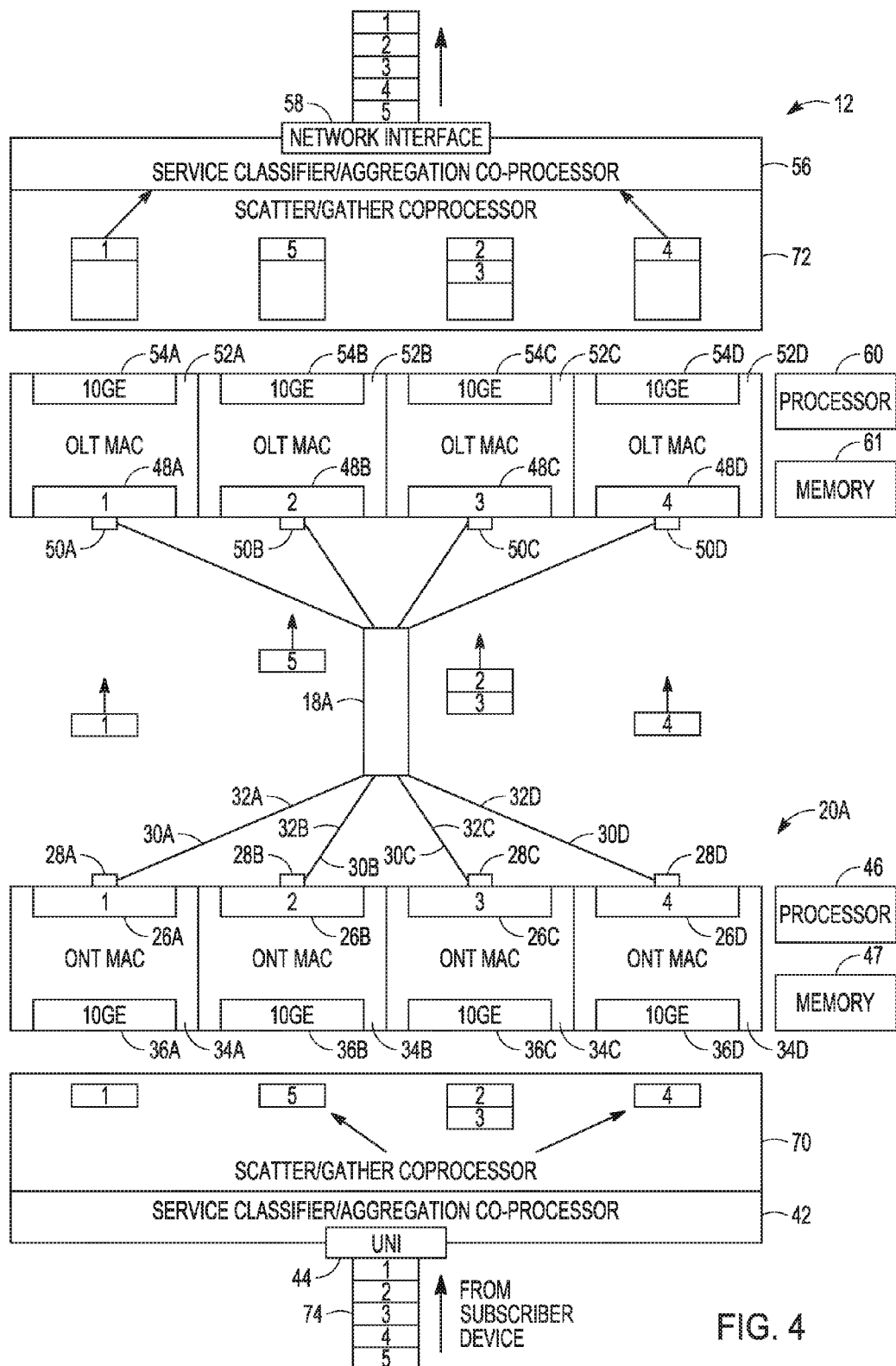
FIG. 4 is a conceptual diagram illustrating another example channel bonding topology using various techniques of this disclosure.

FIG. 4 is a conceptual diagram illustrating another example channel bonding topology using various techniques of this disclosure. The ONT 20A of FIG. 4 can include components similar to the ONT 20A of FIG. 2 and, as such, similar components will not be described again for purposes of conciseness. As seen in FIG. 4, the ONT 20A can include a scatter-gather co-processor 70 that can implement various scatter-gather techniques, as described below.

As indicated above, the service aggregation grouping techniques of this disclosure can use hashing algorithms to map service-flows into physical channels. At any given time, however, a channel can experience congestion and backlog, which can reduce the available bandwidth to the flow. Static hashing can strand the service flow to a single channel during which time the flow can be subject to congestion.

An example solution to this problem is for the ONT 20A to implement scatter-gather frame forwarding techniques. Scatter-gather algorithms are most commonly associated with file system transfers where blocks of memory are partitioned into segments, sent between two storage mediums such as RAM, Flash memory, or a magnetic drive, and reassembled once all pieces are complete insuring the underlying file is intact. Once intact, the file or memory block can be released to the operating system for processing.

A scatter gather frame forwarding block can allow the service tunnel aggregation grouping implementation to bypass hashing algorithms of service flows in favor of an 'any frame to any channel' algorithm without frame reordering issues. Frames can be sent on the channel with the least backlog, e.g., least latency, based on queue depths, or using some other backpressure metric rather than a hashing function. The scatter-gather function at the far end, e.g., the OLT 12 if upstream transmission, can take received frames and re-order them onto the originating channel. For example, the far-end gather block, e.g., of the OLT 12 if upstream transmission, can store frames by sequence number and transmit in order once any gaps have cleared.

Scatter-gather techniques can solve some important problems with the static hashing. First, service-flows need not be restricted to the maximum bandwidth of a physical channel. For example, on a 10G ONT, a scatter-gather co-processor 70 can have an advantage of allowing greater than 10G per flow and can provide the greatest theoretical channel utilization efficiency, and can adapt to real-time congestion. Second, although it has the option of running "over the top," an important aspect is that scatter-gather can be built into the OLT MAC as part of the pre-existing frame reassembly and may not add any meaningful cost. That is, the scatter-gather algorithm can advantageously be an extension of the upstream frame reassembly. Frames can already be fragmented and reassembled on a per-service basis by the OLT MAC.

Deep, high-speed reassembly buffers can be a component of NG-PON2 OLTs and can be suited to work in the context of a streaming scatter-gather algorithm, as described herein. A large scatter-gather buffer in the upstream OLT 12 can be desirable due to the significantly larger frame-delay variances due to dynamic bandwidth allocation (DBA).

Scatter-gather can also eliminate the need for multi-channel scheduling because the service can be shaped prior to the scatter function. As long as the total multi-channel capacity is sufficient for the service, the scattering algorithm can be sending to the channel of least backlog and can be efficient at filling the pipe. Aggregate throughput can be the summation of all the individual channel policies, regardless of how they are distributed across the channels.

In an example scatter-gather technique, the ONT 20A can implement queue backlog techniques to distribute the frames to the bonded channels. For example, the ONT 20A can dynamically hash service flows to channels with less congestion. Another benefit of dynamic hashing is that it can improve or optimize load balancing. In order to relieve any frame-ordering issue of switching channels, the hashing function can include built-in hysteresis and a wait time before changing physical channels to allow the congested channel to clear.

In some example implementations, the ONT 20A can transmit the frames of the classified service toward the OLT 12 after determining a level of congestion of each of the two or more physical channels. For example, the scatter-gather co-processor 70 can determine a length of a queue backlog (or size of occupancy) of each of the two or more physical channels. The scatter-gather co-processor 70 can keep track of the available network interfaces 28A-28D based on the associated level of congestion. Then, the service classifier/aggregation switch circuit 42 can assign each of the plurality of received frames to one two or more physical channels based on the determined level of congestion. In this manner, the ONT 20A can utilize a channel of least congestion technique to dynamically move traffic from one channel to another channel until the congestion clears.

Dynamically hashing the service flows can result in frames being received out of order by the OLT 12. Thus, in some example implementations, for each of the plurality of received frames, and prior to performing the scatter operation of dynamically hashing the service flow, the scatter-gather co-processor 70 can add a sequence number to a field to indicate a position of the frame in a flow.

By way of specific example, assume that the service classifier/aggregation switch circuit 42 has classified five frames of a flow into a service and the service was assigned XGEM ID=1000. The scatter-gather co-processor 70 can add a sequence number, e.g., 1, 2, 3, 4, 5, to a field in the frame to specify the position of the frame within the flow. The scatter-gather co-processor 70 could assign the first frame of the flow a sequence number "1", the second frame a sequence number "2", the third frame a sequence number "3", and so forth so that the OLT 12 can re-order the frames in their correct order upon receipt.

Rather than use a dynamic hashing strategy, in some example scatter-gather implementations, the ONT 20A can transmit the frames of the classified service toward the OLT 12 after the service classifier/aggregation switch circuit 42 has assigned each of the plurality of received frames to one two or more physical channels using a round-robin strategy. Instead of sending the frames to the bonded channels in the order in which the ONT 20A received the frames, the scatter-gather co-processor 70 can assign the first frame received to the first bonded channel, the second frame received to the second bonded channel, the third frame received to the third bonded channel (or to the first channel if only two channels are bonded).

A round-robin strategy, however, can result in frames being received out of order by the OLT 12. Thus, in some example implementations, for each of the plurality of received frames, and prior to performing the scatter operation of performing a round-robin technique on the service flow, the scatter-gather co-processor 70 can add a sequence number to a field to indicate a position of the frame in a flow, as described above with respect to dynamic hashing.

An upstream frame flow is shown in FIG. 4 with the scatter-gather co-processor 70 of the ONT 20A implementing a scattering function and the scatter-gather co-processor 72 of the OLT 12 implementing a gathering function. With the gathering function (top portion of FIG. 4), frames can be constantly received by the OLT 12 and can be reassembled, e.g., using a deep, high speed buffer associated with the scatter-gather co-processor 72 of the OLT 12.

Due to the variable upstream latency, frames can be received out of order when viewed across multiple channels. The gather algorithm of the scatter-gather co-processor 72 of the OLT 12 can monitor the next pending frame of each of the queues in the service tunnel aggregation grouping and forward the frame when it is the next in line, thereby preserving the overall order of the grouping. Lost frames can create sequence gaps and can be discarded based upon configurable maximum wait times, for example. In some examples, the OLT 12 can add a sequence number to the frame, as described above.

With the scattering function (bottom portion of FIG. 2) implemented by the scatter-gather co-processor 70 of the ONT 20A, frames can be received from the service classifier/aggregation circuit 42, which can include multiple physical channels. Frames can be distributed across the service tunnel aggregation membership group based upon the interface with the lowest congestion. Load balancing algorithms can also be used when no congestion is present.

The service classifier/aggregation circuit 42 of the ONT 20A can receive five frames 74 in order. The scattering function of the scatter-gather co-processor 70 can send the frames to the channel of least backlog of the ONT 20A, e.g., one of channels 32A-32D. Due to the variable latency, frame #5 can be the first frame sent by the ONT 20A to the OLT 12. The OLT 12 can reassemble the five frames and can hold onto the frames until frame number #1 has been received, at which time the OLT 12 can continue transmission to the OLT network interface 58 in the proper frame order (e.g., frames 1, 2, 3, 4, 5).

A similar function can be performed in the downstream direction. That is, the scatter-gather co-processor 72 of the OLT 12 can perform a scattering function and the scatter-gather co-processor 70 of the ONT 20A can perform a gather function.

Regarding latency, it can be desirable to minimize frame delay at the OLT gathering function and provide sufficient buffering to handle short term frame delay variation on adjacent channels. There can be numerous causes of short term frame delay variance/latency, including DBA polling latency, ranging window quiet periods, and congestion, for example.

In a four channel system, a delay on one channel can cause a backup on the other three. The overall latency of the service may not be impacted any more than what a single channel produces, however, the buffering requirements on the OLT can grow and may need to be sized accordingly. While not required, there are some strategies that can be employed by the OLT to mitigate this, including synchronizing ranging windows (e.g., deterministic delay on all channels), favored/synchronized polling on bonded services, and synchronized/load-balancing DBA.

Synchronizing the OLT scheduling can help to create deterministic channel latency across bonded services and can reduce the amount of time an OLT queue waits for an in-transit frame to arrive. When all channels are delayed simultaneously, the OLT backlogs can be reduced. Additionally, synchronizing DBA/polling can allow a common service profile and a round-robin approach to be employed.

Without any synchronization, it can be desirable to include buffer to handle up to 250 us of line-rate traffic (3.1 MB per PON). Channels may temporarily run a backlog, but can catch up during their own channel delays and as a result of the scattering algorithm congestion avoidance. Time to wait setting can be explicit, or can be set to resume transmission once buffering approaches a capacity threshold.

For a synchronized system, buffering can be reduced to a single frame (125 us)/1.5 MB.

Regarding priority queues, the scattering function can rely on backpressure to send frames onto channels. If the queue is backlogged, there may come a point when the frame has nowhere to be sent and must be discarded. The service tunnel aggregation grouping service can contain a priority queue rated for the aggregate service such that backlogs that arise less than the peak rate can be discarded in an orderly fashion.

As mentioned above, this disclosure includes a number of other techniques that can increase the efficiency of the multi-channel implementation of the service tunnel aggregation techniques described. These techniques can include the Multi-channel Bandwidth Profile Coherency.

Regarding multi-channel bandwidth profile coherency, to properly load balance a multi-channel service tunnel aggregation grouping service, it can be desirable to have all physical channels active. However, standard per-channel scheduling does not have any knowledge of adjacent channels. Peak rate allocations that occur on one channel may not be accounted for on other channels. One solution can be to design a DBA algorithm that allows a common peak/assured/committed bandwidth profile to be maintained across multiple channels while keeping individual channels. An advantage can be that the DBA algorithm can utilize the channel of least congestion while servicing the high-level bandwidth profile. Allocations in-transit can be broadcasted to adjacent channels such that aggregate rates are enforced.

In addition, variable time-to-live settings can be allowed such that frame loss on a channel does not indefinitely pause the gathering process. In normal operation of a reassembly buffer, e.g., in the OLT 12, frames can be released once the reassembly is complete. An additional feature can include a frame sequence checker that can monitor all channels of the service tunnel aggregation grouping can require the next-in-line frame to go, no matter which channel it arrived on. Waiting frames that are out of order can be held until the next sequence number is present, thereby preserving frame order across the service tunnel aggregation grouping service.

A time-to-wait counter on all frames can be enforced such that frame delays can be allowable for a minimum, configurable time. If a pending sequence gap does not clear in the allotted time, the next frame in line can be released and the stream can continue in order from there. Previous frames that arrive late can be discarded and re-transmitted by the TCP clients.

Enforcing sequence numbers can be applied in a number of different ways. First, a single per service tunnel aggregation grouping sequence number can be added to the frame by the ONT and removed by the OLT once the sequence number has been verified and enforced. The options field of the XGEM header can be sufficiently sized to allow for a service-level sequence number such that no additional bandwidth would be required. A single per service tunnel aggregation service sequence number can have the advantage that each service can operate as a simple FIFO at the OLT. In a more complicated buffering system, sequence numbers can be enforced by the TCP/UDP sequence numbers such that per-flow ordering was maintained, rather than requiring per-service order.

Additionally, the sequence number can double as a timestamp such that the overriding service can enforce time-to-wait/latency maximum.

ONT provisioning between the four channels shown in the example can be the same. Each ONT is configured with the same XGEM service, tag action, classification, etc. Ingress frames received by the ONT from the scattering function will be classified identically on all channels and sent to the OLT.

The ONT 20A and the OLT 12 of FIG. 4 can implement the channel bonding techniques described above with respect to FIG. 2. For purposes of conciseness, these techniques will not be described again.

Figure 5:
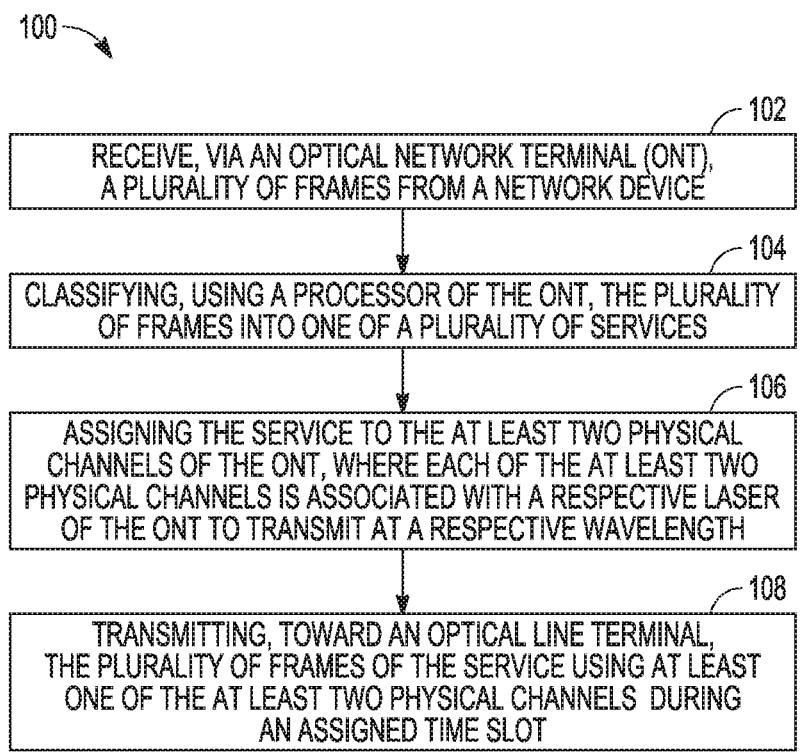
FIG. 5 is a flow diagram illustrating an example method implementing various techniques of this disclosure.

FIG. 5 is a flow diagram illustrating an example method 100 implementing various techniques of this disclosure. At block 102, an ONT, e.g., ONT 20A of FIG. 2, can receive a plurality of frames from a network device, e.g., one or more subscriber devices 22A of FIG. 2. At block 104, the ONT can classify the plurality of frames into one of a plurality of services. For example, a service classifier/aggregation switch circuit 42 of ONT 20A of FIG. 2 can classify data units according to service.

At block 106, the ONT, e.g., the processor 46 of the ONT 20A of FIG. 2, can assign the service to two or more two physical channels of the ONT, where each of the two or more physical channels is associated with a respective laser of the ONT to transmit at a respective wavelength. At block 108, the ONT can transmit, toward an optical line terminal, the plurality of frames of the service using at least one of the two or more physical channels during an assigned time slot.

In some example implementations, the ONT can apply a hashing function to each of the plurality of received frames, and assigning the plurality of received frames to the at least two physical channels based on a result of the hashing function. For example, the ONT can apply the hashing function to at least one of a media access control (MAC) address and an internet protocol (IP) address of each of the plurality of received frames.

In other example implementations, the ONT can determine a level of congestion of each of the two or more physical channels, e.g., determine a length of a queue backlog, and assign each of the plurality of received frames to one of the two or more physical channels based on the determined level of congestion. The ONT can adding a sequence number to a field to indicate a position of the frame in a flow for each of the plurality of received frames.

In some examples, the ONT can assign each of the plurality of received frames to one of the two or more physical channels using a round-robin strategy. The ONT can adding a sequence number to a field to indicate a position of the frame in a flow for each of the plurality of received frames.

In other example implementations, the ONT can add, for each of the plurality of received frames in a classified service, a NG-PON2 encapsulation method (XGEM) port ID to identify the classified service, and assign the plurality of received frames to the two or more physical channels based on the XGEM port ID.

As mentioned above, the techniques described above with respect to the ONT, including the method of FIG. 5, can also be implemented by an OLT, e.g., OLT 12 of FIG. 2. The OLT can receive a plurality of frames, classify the frames using service classifier/aggregation switch circuit 56, assigning the service to two or more physical channels of the OLT, where each of the two or more physical channels is associated with a respective laser of the OLT to transmit at a respective wavelength, and can transmit, toward an ONT, the plurality of frames of the service using at least one of the two or more physical channels during an assigned time slot. The OLT can also use hashing, dynamic hashing, scatter-gather, levels of congestion, and other techniques described above with respect to ONTs to virtually bond together at least two physical channels.

Additional Notes and Aspects

The above detailed description includes references to the accompanying drawings, which form a part of the detailed description. The drawings show, by way of illustration, specific embodiments in which the invention can be practiced. These embodiments are also referred to herein as "examples" or "aspects". Such examples or aspects can include elements in addition to those shown or described. However, the present inventor also contemplates examples in which only those elements shown or described are provided. Moreover, the present inventor also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

In some embodiments, various techniques of this disclosure can be implemented using pre-defined logic that performs a specific logic function, in addition to or instead of sequentially executed code. For example, various aspects of this disclosure can be implemented at least in part by dedicated circuitry or logic that is permanently configured to perform certain operations, including, for example, a special-purpose processor, such as a field programmable gate array (FPGA) or an ASIC.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

The invention claimed is:

1. A method of virtually bonding together at least two physical channels in an optical network terminal (ONT) of a passive optical network (PON), the method comprising:
    receiving, via the ONT, a plurality of frames from a network device;
    classifying, using a processor of the ONT, the plurality of frames into one of a plurality of services;
    assigning the service to the at least two physical channels of the ONT, wherein each physical channel is associated with a corresponding laser of the ONT, and wherein each laser of the ONT is configured to transmit at a different wavelength; and
    transmitting the plurality of frames of the service toward an optical line terminal (OLT) using at least two different wavelengths corresponding to the at least two physical channels during an assigned time slot.

2. The method of claim 1, wherein transmitting, toward an optical line terminal, the plurality of frames of the service using at least one of the at least two physical channels includes:
    applying a hashing function to each of the plurality of received frames; and
    assigning the plurality of received frames to the at least two physical channels based on a result of the hashing function.

3. The method of claim 2, wherein applying a hashing function to each of the plurality of received frames includes:
    applying the hashing function to at least one of a media access control (MAC) address and an internet protocol (IP) address of each of the plurality of received frames.

4. The method of claim 1, wherein transmitting, toward an optical line terminal, the plurality of frames of the service using at least one of the at least two physical channels includes:
    determining a level of congestion of each of the at least two physical channels; and
    assigning each of the plurality of received frames to one of the at least two physical channels based on the determined level of congestion.

5. The method of claim 4, wherein determining a level of congestion of each of the at least two physical channels includes:
    determining a length of a queue backlog of each of the at least two physical channels.

6. The method of claim 4, further comprising:
    for each of the plurality of received frames, adding a sequence number to a field to indicate a position of the frame in a flow.

7. The method of claim 1, wherein transmitting, toward an optical line terminal, the plurality of frames of the service using at least one of the at least two physical channels includes:
    assigning each of the plurality of received frames to one of the at least two physical channels using a round-robin strategy.

8. The method of claim 7, further comprising:
    for each of the plurality of received frames, adding a sequence number to a field to indicate a position of the frame in a flow.

9. The method of claim 1, wherein classifying, using a processor of the ONT, the plurality of frames into one of a plurality of services includes:
    adding, for each of the plurality of received frames in a classified service, a NG-PON2 encapsulation method (XGEM) port ID to identify the classified service, the method further comprising:
assigning the plurality of received frames to the at least two physical channels based on the XGEM port ID.

10. An optical network terminal (ONT) comprising:
one or more processors; and
at least one memory including instructions that, when executed by the one or more processors, cause the one or more processors to perform operations to:
receive a plurality of frames from a network device;
classify the plurality of frames into one of a plurality of services;
assign the service to the at least two physical channels of the ONT, wherein each physical channel is associated with a corresponding laser of the ONT, and wherein each laser of the ONT is configured to transmit at a different wavelength; and
transmit the plurality of frames of the service toward an optical line terminal (OLT) using at least two different wavelengths corresponding to the at least two physical channels during an assigned time slot.

11. The ONT of claim 10, wherein the instructions to transmit, toward an optical line terminal, the plurality of frames of the service using at least one of the at least two physical channels includes instructions to:
apply a hashing function to each of the plurality of received frames; and
assign the plurality of received frames to the at least two physical channels based on a result of the hashing function.

12. The ONT of claim 11, wherein the instructions to apply a hashing function to each of the plurality of received frames includes instructions to:
apply the hashing function to at least one of a media access control (MAC) address and an internet protocol (IP) address of each of the plurality of received frames.

13. The ONT of claim 10, wherein the instructions to transmit, toward an optical line terminal, the plurality of frames of the service using at least one of the at least two physical channels includes instructions to:
determine a level of congestion of each of the at least two physical channels; and
assign each of the plurality of received frames to one of the at least two physical channels based on the determined level of congestion.

14. The ONT of claim 13, wherein the instructions to determine a level of congestion of each of the at least two physical channels includes instructions to:
determine a length of a queue backlog of each of the at least two physical channels.

15. The ONT of claim 13, including further instructions that, when executed by the one or more processors, cause the one or more processors to perform operations to:
for each of the plurality of received frames, add a sequence number to a field to indicate a position of the frame in a flow.

16. The ONT of claim 10, wherein the instructions to transmit, toward an optical line terminal, the plurality of frames of the service using at least one of the at least two physical channels includes instructions to:
assign each of the plurality of received frames to one of the at least two physical channels using a round-robin strategy.

17. The ONT of claim 16, including further instructions that, when executed by the one or more processors, cause the one or more processors to perform operations to:
for each of the plurality of received frames, add a sequence number to a field to indicate a position of the frame in a flow.

18. The ONT of claim 10, wherein the instructions to classify, using a processor of the ONT, the plurality of frames into one of a plurality of services includes instructions to:
add, for each of the plurality of received frames in a classified service, a NG-PON2 encapsulation method (XGEM) port ID to identify the classified service, the method further comprising:
assign the plurality of received frames to the at least two physical channels based on the XGEM port ID.

19. A method of virtually bonding together at least two physical channels in an optical network terminal (ONT) of a passive optical network (PON), the method comprising:
receiving, via the ONT, a plurality of frames from a network device;
classifying, using a processor of the ONT, the plurality of frames into one of a plurality of services;
assigning the service to the at least two physical channels of the ONT, wherein each of the at least two physical channels is associated with a respective laser of the ONT to transmit at a respective wavelength; and
transmitting, toward an optical line terminal, the plurality of frames of the service using at least one of the at least two physical channels during an assigned time slot, wherein transmitting, toward an optical line terminal, the plurality of frames of the service using at least one of the at least two physical channels includes:
applying a hashing function to at least one of a media access control (MAC) address and an internet protocol (IP) address of each of the plurality of received frames; and
assigning the plurality of received frames to the at least two physical channels based on a result of the hashing function.

* * * * *